(12) United States Patent
Eldin et al.

(10) Patent No.: US 9,779,768 B2
(45) Date of Patent: Oct. 3, 2017

(54) SYSTEMS AND METHODS FOR DYNAMICALLY CLEANING READ/WRITE HEAD

(71) Applicant: Dell Products L.P., Round Rock, TX (US)

(72) Inventors: Dina Eldin, Round Rock, TX (US); Randy M Ortiz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/047,406

(22) Filed: Feb. 18, 2016

(65) Prior Publication Data
US 2017/0243606 A1    Aug. 24, 2017

(51) Int. Cl.
*G11B 5/09* (2006.01)
*G11B 5/41* (2006.01)
*G11B 5/008* (2006.01)
*G11B 5/40* (2006.01)
*G11B 5/455* (2006.01)
*G11B 20/18* (2006.01)

(52) U.S. Cl.
CPC ............... *G11B 5/41* (2013.01); *G11B 5/008* (2013.01); *G11B 5/40* (2013.01); *G11B 5/455* (2013.01); *G11B 20/1816* (2013.01)

(58) Field of Classification Search
None
See application file for complete search history.

(56) References Cited

U.S. PATENT DOCUMENTS

| | | | | |
|---|---|---|---|---|
| 5,210,735 A * | 5/1993 | Hoshino | ................. | G11B 7/12 250/559.41 |
| 5,369,285 A * | 11/1994 | Georgis | ................. | G11B 5/41 250/559.28 |
| 5,406,540 A * | 4/1995 | Longman | ............... | G11B 7/126 369/116 |
| 5,706,145 A * | 1/1998 | Hindman | ........... | G11B 5/00813 360/18 |
| 6,215,618 B1 * | 4/2001 | Anderson | ............... | G11B 5/41 360/128 |
| 6,359,751 B1 * | 3/2002 | Groel | ..................... | G11B 15/67 360/128 |
| 2002/0085464 A1 * | 7/2002 | Mashimo | ............... | G11B 7/121 369/53.2 |
| 2002/0191523 A1 * | 12/2002 | Warmenhoven | ..... | G11B 23/505 369/72 |
| 2006/0238911 A1 * | 10/2006 | MacKelden | ............ | G11B 5/41 360/69 |

* cited by examiner

*Primary Examiner* — Peter Vincent Agustin
(74) *Attorney, Agent, or Firm* — Jackson Walker L.L.P.

(57) ABSTRACT

A sequential storage media system may include a head for reading or writing data to sequential storage media and a controller communicatively coupled to the head. The controller may be configured to control winding of a tape comprising cleaning media between reels of a cartridge comprising the tape in order to determine an occurrence of an event indicative of a need to clean a head of a sequential storage media system, issue to a user an indication of the occurrence of the event, determine an amount of cleaning for the head based on a bit error rate of input/output communication associated with the head, and responsive to receiving a cleaning cartridge in the sequential storage media system, clean the head of a sequential storage media system in accordance with the amount of cleaning by passing cleaning media of a cartridge over the head.

19 Claims, 5 Drawing Sheets

SYSTEMS AND METHODS FOR DYNAMICALLY CLEANING READ/WRITE HEAD

TECHNICAL FIELD

The present disclosure relates in general to information handling systems, and more particularly to systems and methods for dynamically cleaning read/write heads of magnetic storage media.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Sequential storage media, also known as tape media, may comprise a reel of a magnetic strip of material in which one or more magnetic heads are used to write data on the media and/or read data from the media. In sequential storage media, the read/write heads may require occasional cleaning in order to remove accumulation of debris on the head.

SUMMARY

In accordance with the teachings of the present disclosure, the disadvantages and problems associated with cleaning read/write heads for magnetic storage media may be reduced or eliminated.

In accordance with embodiments of the present disclosure, a method may include cleaning a head of a sequential storage media system by passing cleaning media of a cartridge over the head. The method may also include after cleaning the head of the sequential storage media system, monitoring a bit error rate of input/output communication between the head and sequential storage media of the cartridge, and repeating the cleaning and the monitoring steps responsive to the bit error rate exceeding a threshold.

In accordance with these and other embodiments of the present disclosure, a sequential storage media system may include a head for reading or writing data to sequential storage media and a controller communicatively coupled to the head. The controller may be configured to control winding of a tape comprising sequential storage media and cleaning media between reels of a cartridge comprising the tape in order to clean a head of a sequential storage media system by passing the cleaning media over the head, after cleaning the head of the sequential storage media system, monitor a bit error rate of input/output communication between the head and the sequential storage media, and repeat the cleaning and the monitoring steps responsive to the bit error rate exceeding a threshold.

In accordance with these and other embodiments of the present disclosure, an information handling system may include a processor and a sequential storage media system communicatively coupled to the processor. The sequential storage media system may include a head for reading or writing data to sequential storage media and a controller communicatively coupled to the head. The controller may be configured to control winding of a tape comprising sequential storage media and cleaning media between reels of a cartridge comprising the tape in order to clean a head of a sequential storage media system by passing the cleaning media over the head, after cleaning the head of the sequential storage media system, monitor a bit error rate of input/output communication between the head and the sequential storage media, and repeat the cleaning and the monitoring steps responsive to the bit error rate exceeding a threshold.

In accordance with these and other embodiments of the present disclosure, a method may include determining an occurrence of an event indicative of a need to clean a head of a sequential storage media system, issuing to a user an indication of the occurrence of the event, determining an amount of cleaning for the head based on a bit error rate of input/output communication associated with the head, and responsive to receiving a cleaning cartridge in the sequential storage media system, cleaning the head of the sequential storage media system in accordance with the amount of cleaning by passing cleaning media of a cartridge over the head.

In accordance with these and other embodiments of the present disclosure, a sequential storage media system may include a head for reading or writing data to sequential storage media and a controller communicatively coupled to the head. The controller may be configured to control winding of a tape comprising cleaning media between reels of a cartridge comprising the tape in order to determine an occurrence of an event indicative of a need to clean a head of a sequential storage media system, issue to a user an indication of the occurrence of the event, determine an amount of cleaning for the head based on a bit error rate of input/output communication associated with the head, and responsive to receiving a cleaning cartridge in the sequential storage media system, clean the head of a sequential storage media system in accordance with the amount of cleaning by passing cleaning media of a cartridge over the head.

In accordance with these and other embodiments of the present disclosure, an information handling system may include a processor and a sequential storage media system communicatively coupled to the processor. The sequential storage media system may include a head for reading or writing data to sequential storage media and a controller communicatively coupled to the head. The controller may be configured to control winding of a tape comprising cleaning media between reels of a cartridge comprising the tape in order to determine an occurrence of an event indicative of a need to clean a head of a sequential storage media system, issue to a user an indication of the occurrence of the event, determine an amount of cleaning for the head based on a bit error rate of input/output communication associated with the head, and responsive to receiving a cleaning cartridge in the sequential storage media system, clean the head of a sequential storage media system in accordance with the amount of cleaning by passing cleaning media of a cartridge over the head.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 9, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
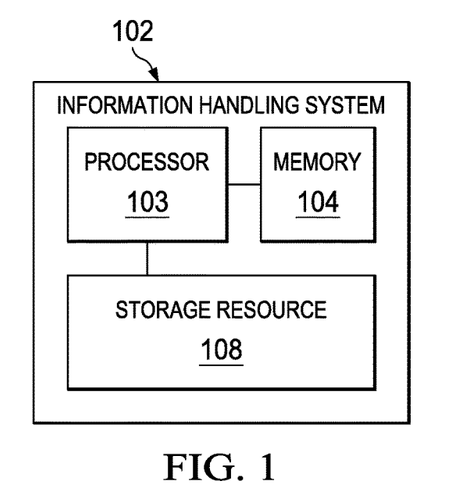
FIG. 1 illustrates a block diagram of selected components of an example information handling system, in accordance with embodiments of the present disclosure.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data.

As depicted in FIG. 1, information handling system 102 may include a processor 103, a memory 104 communicatively coupled to processor 103, and a storage resource 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

Storage resource 108 may include a system, device, or apparatus configured to store data. Storage resource 108 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 108 may include one or more storage enclosures configured to hold and/or power one or more of such devices. In the embodiments represented by FIG. 1, storage resource 108 may reside within information handling system 102. However, in other embodiments, storage resource 108 may reside external to information handling system 102 (e.g., may be coupled to information handling system 102 via a network).

In particular embodiments, storage resource 108 may comprise a sequential storage media system. A sequential storage media system may comprise any system, device, or apparatus for storing or recording information on sequential storage media (e.g., magnetic tape). Such sequential storage media may be packaged in cartridges or cassettes.

In addition to processor 103, memory 104, and storage resource 108, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
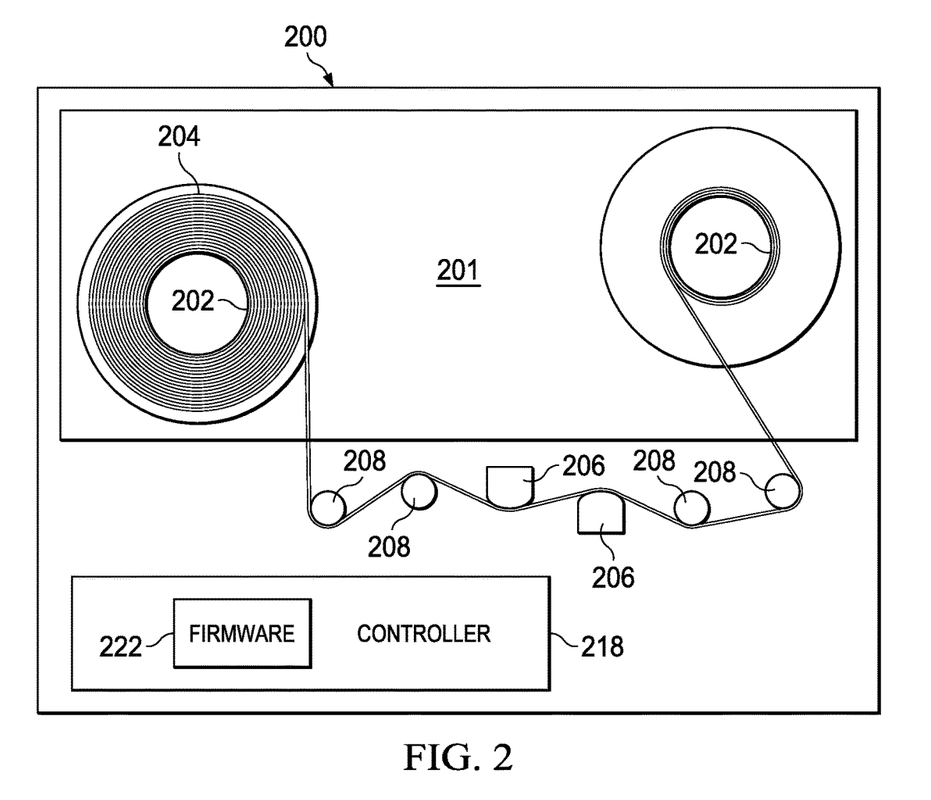
FIG. 2 illustrates a block diagram of selected components of an example sequential storage media system, in accordance with embodiments of the present disclosure.

FIG. 2 illustrates a block diagram of selected components of an example sequential storage media system 200, in accordance with embodiments of the present disclosure. Sequential storage media system 200 may be used as, or as part of, storage resource 108 of information handling system 102 of FIG. 1. As shown in FIG. 2, sequential storage media system 200 may comprise a removable data cartridge 201, one or more read/write heads 206, a plurality of guides 208, and a controller 218.

As shown in FIG. 2, data cartridge 201 may include two reels 202 for carrying sequential storage media tape 204. Each reel 202 may comprise any suitable system, device, or apparatus for carrying sequential storage media tape 204, and winding sequential storage media tape 204 between reels 202. Accordingly, one or both of reels 202 may include or be configured to couple to mechanical parts (e.g., motors or other drive system controlled by controller 218) for driving one or both reels 202 in a rotational manner in order to wind sequential storage media tape 204 from one reel to another.

Figure 3:
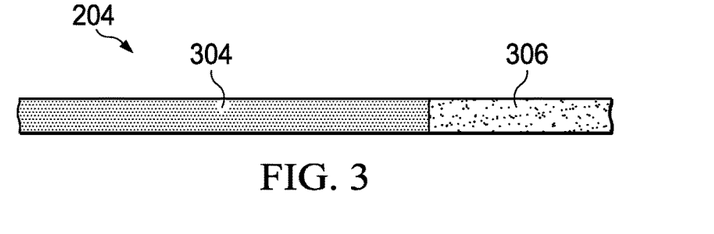
FIG. 3 illustrates an example sequential storage media tape for use in the example storage media system of FIG. 2, in accordance with embodiments of the present disclosure.

Turning briefly to FIG. 3, FIG. 3 illustrates an example sequential storage media tape 204 for use in example data cartridge 201, in accordance with embodiments of the present disclosure. As shown in FIG. 3, sequential storage media tape 204 may predominantly include sequential storage media 304 and a small portion of cleaning media 306. For example, in some embodiments, cleaning media 306 may comprise no more than five or ten percent of sequential storage media tape 204.

Sequential storage media 304 may comprise a strip of magnetic material for magnetic recording. For example, sequential storage media 304 may comprise a long, narrow strip of plastic film which is coated on at least one side with a thin magnetizable coating. If coated on both sides with magnetizable coating, such sequential storage media 304 may support recording separate data on each side of the plastic film, and thus may function as dual-sided sequential storage media.

Cleaning media 306 may include abrasive material and/or other material for cleaning a read/write head 206. Cleaning media 306 and sequential storage media 304 may be formed on the same piece of sequential storage media tape 204. In some embodiments, cleaning media 306 may be formed on the same strip of plastic film used for sequential storage media 304, with the exception that instead of including magnetizable coating, the portion of the strip of plastic film for cleaning media 306 may be coated with the abrasive and/or other material for cleaning a read/write head 206. In other embodiments, sequential storage media 304 and cleaning media 306 may be formed on different strips of material coupled to one another in any suitable fashion (e.g., via an adhesive). Sequential storage media 304 and cleaning media 306 may respectively be formed on any suitable portions of sequential storage media tape 204. In some embodiments, cleaning media 306 may be formed on one or both ends of sequential storage media tape 204 (e.g., more proximate to the attachment points of sequential storage media tape 204 to reels 202 than that of sequential storage media 304).

Turning again to FIG. 2, as sequential storage media tape 204 is translated between reels 202, continuous portions of sequential storage media tape 204 may come in contact with one or more heads 206. A head 206 may comprise any system, device, or apparatus configured to read data from and/or write data to sequential storage media 304 of sequential storage media tape 204 as continuous portions of sequential storage media 304 pass over such head 206 by modifying the magnetization of such sequential storage media 304 in accordance with the information to be written. In some embodiments, a head 206 may comprise a read/write head which is also capable of reading data from sequential storage media 304 by detecting the magnetization of sequential storage media 304.

In addition, as sequential storage media tape 204 is translated between reels 202, continuous portions of cleaning media 306 of sequential storage media tape 204 may come in contact with a head 206, cleaning such head 206 by removing debris from the head 206 as such portions of cleaning media 306 pass over such head 206.

In order to guide sequential storage media tape 204 to contact with a head 206 as it is wound between reels 202, sequential storage media system 200 may include guides 208. One or more of guides 208 may be capable of rotation about an axis (e.g., wherein such axis is perpendicular to the view shown in FIG. 2) such that guides 208 may rotate as sequential storage media tape 204 passes over them, thus facilitating the winding of sequential storage media tape 204 as it passes over a head 206.

Controller 218 may comprise any system, device, or apparatus configured to control the communication of I/O data between a processor (e.g., processor 103) and sequential storage media tape 204 via heads 206, and thus may be communicatively coupled to heads 206. Controller 218 may include, without limitation, a microprocessor, microcontroller, digital signal processor (DSP), application specific integrated circuit (ASIC), or any other digital or analog circuitry configured to interpret and/or execute program instructions and/or process data. In some embodiments, controller 218 may interpret and/or execute program instructions embodied in firmware 222 stored on computer-readable media integral to or otherwise accessible to controller 218 in order to carry out functionality of controller 218.

Firmware 222 may include a program of executable instructions stored on computer-readable media integral or accessible to controller 218 which is readable and executable by controller 218 to carry out the functionality of controller 218. For example, firmware 222 may control the communication of I/O data between a processor (e.g., processor 103) and sequential storage media tape 204 via heads 206. As another example, firmware 222 may control dynamic cleaning operations for disk cartridge 201 and/or a cleaning cartridge, as described in greater detail below with respect to methods 400, 700, and 900.

Although sequential storage media system 200 is shown in FIG. 2 as including two heads 206, in some embodiments, sequential storage media system 200 may include one head 206 or more than two heads 206.

Although disk cartridge 201 is shown as having two reels 202 integral thereto, in some embodiments, a disk cartridge 201 may include only one reel 202. In such embodiments, a second reel 202 (e.g. a "take-up" reel may be part of sequential storage media system 200).

Figure 4:
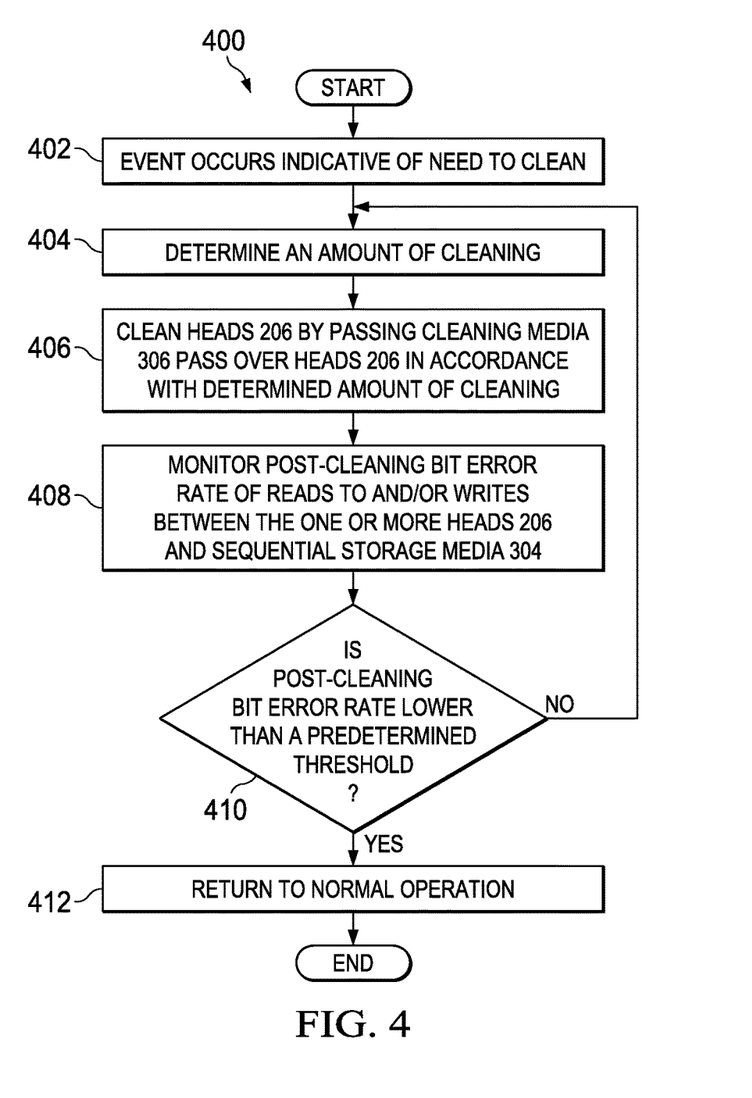
FIG. 4 illustrates a flow chart of an example method for dynamically cleaning a read/write head using the sequential storage media tape depicted in FIG. 3, in accordance with embodiments of the present disclosure.

FIG. 4 illustrates a flow chart of an example method 400 for dynamically cleaning a read/write head 206 using sequential storage media tape 204, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, controller 218 may determine an event has occurred indicative of a need to clean one or more heads 206. In some embodiments, such event may be a passage of a periodic interval of time (e.g., predetermined intervals of a number of days), wherein such passage of time indicates that one or more heads 206 should be cleaned. In these and other embodiments, such event may include a determination by controller 218 that a bit error rate of writes to or reads from a head 206 to or from sequential storage media 304 of data cartridge 201 is above a predetermined threshold.

At step 404, controller 218 may determine an amount of cleaning. In some embodiments, such amount of cleaning may be based on a bit error rate of writes or reads between one or more heads 206 and sequential storage media 304 (e.g., such that a larger amount of cleaning is applied for higher bit error rates, and a smaller amount of cleaning is applied for lower bit error rates). In these and other embodiments, such amount of cleaning may be defined by an amount of time that a portion of cleaning media 306 is to be passed over one or more heads 206 to undergo cleaning. In other embodiments, such amount of cleaning may be defined by a number of times a portion of cleaning media 306 is to be passed over one or more heads 206 to undergo cleaning.

At step 406, controller 218 may cause one or more heads 206 to be cleaned by causing cleaning media 306 to pass over the one or more heads 206 in accordance with the determined amount of cleaning. After such amount of cleaning is applied, method 400 may proceed to step 408.

At step 408, controller 218 may monitor the post-cleaning bit error rate of reads to and/or writes between the one or more heads 206 and sequential storage media 304. In some embodiments, such monitoring may be implemented by a test procedure in which controller 218 causes one or more heads to write a predetermined pattern to sequential storage media 304 and read back the predetermined pattern from sequential storage media 304 in order to determine the bit error rate. In other embodiments, such monitoring may be implemented by monitoring actual input/output operations occurring to and from sequential storage media 304 (e.g., between processor 103 and sequential storage media 304).

At step 410, controller 218 may determine whether the post-cleaning bit error rate is lower than a predetermined threshold. Such predetermined threshold may be the same as or different from the predetermined threshold applied at step 402. If the post-cleaning bit error rate is lower than the predetermined threshold, method 400 may proceed to step 412. Otherwise, method 400 may proceed again to step 404, and steps 404-410 may repeat until such time as the post-cleaning bit error rate falls below the predetermined threshold.

At step 412, operation of sequential storage media system 200 may return to its normal operation. After step 412, method 400 may end, subject to method 400 being applied again at a later time should another event occur as described with respect to step 402.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware (e.g., firmware 222) embodied in computer-readable media.

Figure 5:
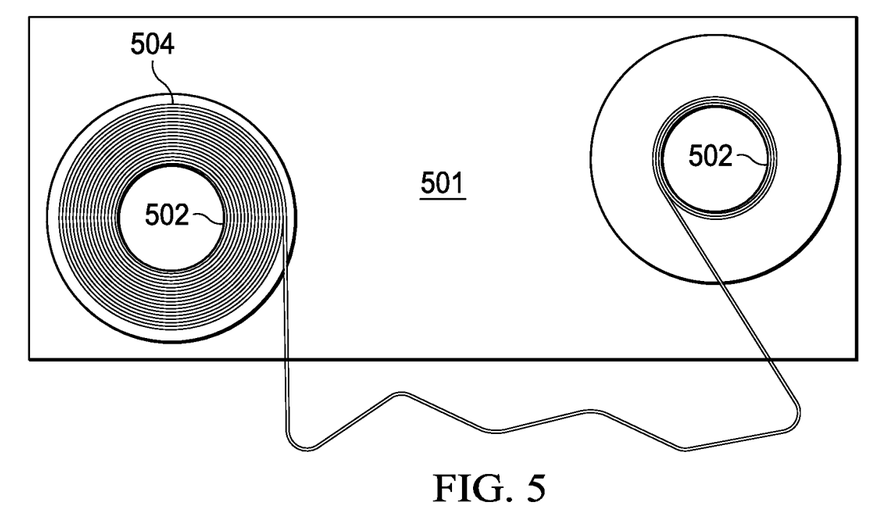
FIG. 5 illustrates an example cleaning cartridge for use in the example storage media system of FIG. 2, in accordance with embodiments of the present disclosure.

FIG. 5 illustrates an example cleaning cartridge 501 for use in example storage media system 200, in accordance with embodiments of the present disclosure. As described above, data cartridge 201 may be removable. After a removal of data cartridge 201, a data cartridge similar to or different from data cartridge 201 may be inserted in its place, or a cleaning cartridge similar to or different from cleaning cartridge 501 may be inserted. Cleaning cartridge 501 may be similar in many respects to a data cartridge 201, and accordingly, only the main differences between cleaning cartridge 501 and data cartridge 201 may be described below.

As shown in FIG. 5, cleaning cartridge 501 may include two reels 502 for carrying cleaning tape 504. Each reel 502 may comprise any suitable system, device, or apparatus for carrying cleaning tape 504, and winding cleaning tape 504 between reels 502. In some embodiments, reels 502 may be similar or identical to reels 202 of data cartridge 201.

Figure 6:
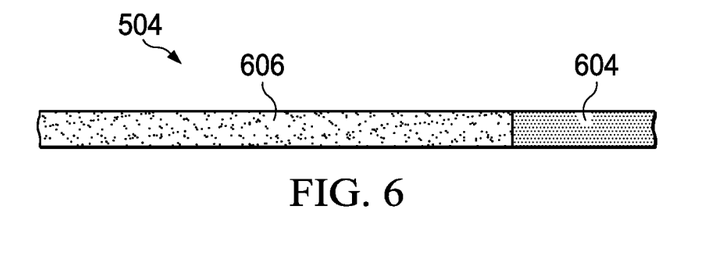
FIG. 6 illustrates an example cleaning cartridge tape for use in the example cleaning cartridge of FIG. 5, in accordance with embodiments of the present disclosure.

Turning briefly to FIG. 6, FIG. 6 illustrates an example cleaning cartridge tape 504 for use in example cleaning cartridge 501, in accordance with embodiments of the present disclosure. As shown in FIG. 6, cleaning cartridge tape 504 may predominantly include cleaning media 606 and a small portion of storage media 604. For example, in some embodiments, storage media 604 may comprise no more than five or ten percent of cleaning cartridge tape 504.

Similar to sequential storage media 304, storage media 604 may comprise a strip of magnetic material for magnetic recording. For example, sequential storage media 604 may comprise a long, narrow strip of plastic film which is coated on at least one side with a thin magnetizable coating.

Similar to cleaning media 306, cleaning media 606 may include abrasive material and/or other material for cleaning a read/write head 206. Cleaning media 606 and storage media 604 may be formed on the same piece of cleaning cartridge tape 504. In some embodiments, cleaning media 606 may be formed on the same strip of plastic film used for storage media 604, with the exception that instead of including magnetizable coating, the portion of the strip of plastic film for cleaning media 606 may be coated with the abrasive and/or other material for cleaning a read/write head 206. In other embodiments, storage media 604 and cleaning media 606 may be formed on different strips of material coupled to one another in any suitable fashion (e.g., via an adhesive). Storage media 604 and cleaning media 606 may respectively be formed on any suitable portions of cleaning cartridge tape 504. In some embodiments, storage media 604 may be formed on one or both ends of cleaning cartridge tape 504 (e.g., more proximate to the attachment points of cleaning cartridge tape 504 to reels 502 than that of sequential cleaning media 606).

Turning again to FIG. 5, as cleaning cartridge tape 504 is translated between reels 502, continuous portions of cleaning media 606 of cleaning cartridge tape 504 may come in contact with a head 206, cleaning such head 206 by removing debris from the head 206 as such portions of cleaning media 606 pass over such head 206.

In addition, as cleaning cartridge tape 504 is translated between reels 502, continuous portions of storage media 604 may come in contact with one or more heads 206, thus allowing the one or more heads 206 to write data to or read data from storage media 604.

Although cleaning cartridge 501 is shown as having two reels 502 integral thereto, in some embodiments, a cleaning cartridge 501 may include only one reel 502. In such embodiments, a second reel 502 (e.g. a "take-up" reel may be part of sequential storage media system 200).

Figure 7:
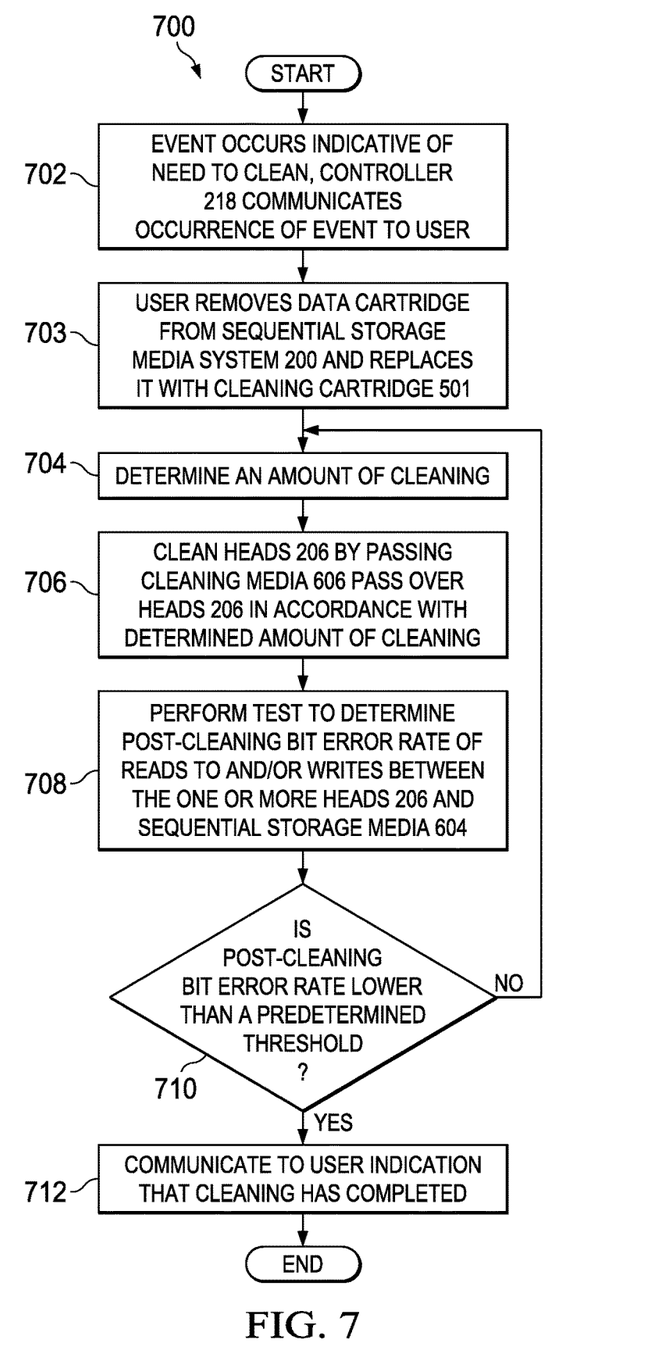
FIG. 7 illustrates a flow chart of an example method for dynamically cleaning a read/write head using the cleaning cartridge tape depicted in FIG. 6, in accordance with embodiments of the present disclosure.

FIG. 7 illustrates a flow chart of an example method 700 for dynamically cleaning a read/write head using cleaning cartridge 501 with cleaning cartridge tape 504, in accordance with embodiments of the present disclosure. According to some embodiments, method 700 may begin at step 702. As noted above, teachings of the present disclosure may be implemented in a variety of configurations of information handling system 102. As such, the preferred initialization point for method 700 and the order of the steps comprising method 700 may depend on the implementation chosen.

At step 702, with a data cartridge inserted in sequential storage media system 200, controller 218 may determine an event has occurred indicative of a need to clean one or more heads 206 and communicate the occurrence of such event to a user of information handling system 102. As an example, such data cartridge may include a "traditional" data cartridge which is similar to data cartridge 201, except that the sequential storage media tape 204 thereof includes sequential storage media 304, but no cleaning media 306. In some embodiments, the event may be a passage of a periodic interval of time (e.g., predetermined intervals of a number of days), wherein such passage of time indicates that one or more heads 206 should be cleaned. In these and other embodiments, such event may include a determination by controller 218 that a bit error rate of writes to or reads from a head 206 to or from sequential storage media of the data cartridge is above a predetermined threshold.

At step 703, the user may, in response to the event, remove the data cartridge from sequential storage media system 200 and replace it with cleaning cartridge 501 in order to clean one or more heads 206.

At step 704, controller 218 may determine an amount of cleaning. In some embodiments, such amount of cleaning may be based on a bit error rate of writes or reads between one or more heads 206 and sequential storage media of the data cartridge that was removed at step 703 (e.g., such that a larger amount of cleaning is applied for higher bit error rates, and a smaller amount of cleaning is applied for lower bit error rates). In these and other embodiments, such amount of cleaning may be defined by an amount of time that a portion of cleaning media 606 is to be passed over one or more heads 206 to undergo cleaning. In other embodiments, such amount of cleaning may be defined by a number of times a portion of cleaning media 606 is to be passed over one or more heads 206 to undergo cleaning.

At step 706, controller 218 may cause one or more heads 206 to be cleaned by causing cleaning media 606 to pass over the one or more heads 206 in accordance with the determined amount of cleaning. After such amount of cleaning is applied, method 700 may proceed to step 708.

At step 708, controller 218 may cause heads 206 to write a predetermined test pattern to sequential storage media 604 and read back the predetermined test pattern from sequential storage media 604 in order to determine a post-cleaning bit error rate.

At step 710, controller 218 may determine whether the post-cleaning bit error rate is lower than a predetermined threshold. Such predetermined threshold may be the same as or different from the predetermined threshold applied at step 702. If the post-cleaning bit error rate is lower than the predetermined threshold, method 700 may proceed to step 712. Otherwise, method 700 may proceed again to step 704, and steps 704-710 may repeat until such time as the post-cleaning bit error rate falls below the predetermined threshold.

At step 712, controller 218 may communicate to the user an alert or other indication that the cleaning process has completed, to which the user may respond by returning the same data cartridge or a new data cartridge to sequential storage media system 200, after which sequential storage media system 200 may return to its normal operation. After step 712, method 700 may end, subject to method 700 being applied again at a later time should another event occur as described with respect to step 702.

Although FIG. 7 discloses a particular number of steps to be taken with respect to method 700, method 700 may be executed with greater or fewer steps than those depicted in FIG. 7. In addition, although FIG. 7 discloses a certain order of steps to be taken with respect to method 700, the steps comprising method 700 may be completed in any suitable order.

Method 700 may be implemented using information handling system 102 or any other system operable to implement method 700. In certain embodiments, method 700 may be implemented partially or fully in software and/or firmware (e.g., firmware 222) embodied in computer-readable media.

Figure 8:
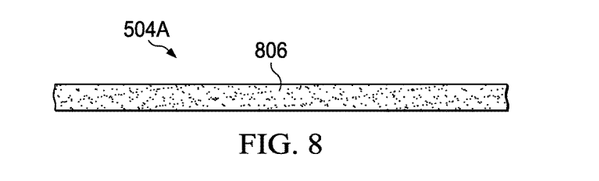
FIG. 8 illustrates another example cleaning cartridge tape for use in the example cleaning cartridge of FIG. 5, in accordance with embodiments of the present disclosure.

FIG. 8 illustrates another example cleaning cartridge tape 504A for use in example cleaning cartridge 501 (e.g., in lieu of cleaning cartridge tape 504), in accordance with embodiments of the present disclosure. Cleaning cartridge tape 504A may be similar in many respects to cleaning cartridge tape 504, and accordingly, only the main differences between cleaning cartridge tape 504A and cleaning cartridge tape 504 may be described below. As shown in FIG. 8, cleaning cartridge tape 504A may predominantly include cleaning media 806 but no storage media as with cleaning cartridge tape 504. Thus, a cleaning cartridge 501 with cleaning cartridge tape 504A having only cleaning media 806 but no storage media may in fact comprise a traditional cleaning cartridge. Similar to cleaning media 306 and cleaning media 606, cleaning media 806 may include abrasive material and/or other material for cleaning a read/write head 206.

As cleaning cartridge tape 504A is translated between reels 502, continuous portions of cleaning media 806 of cleaning tape 504A may come in contact with a head 206, cleaning such head 206 by removing debris from the head 206 as such portions of cleaning media 806 pass over such head 206.

Figure 9:
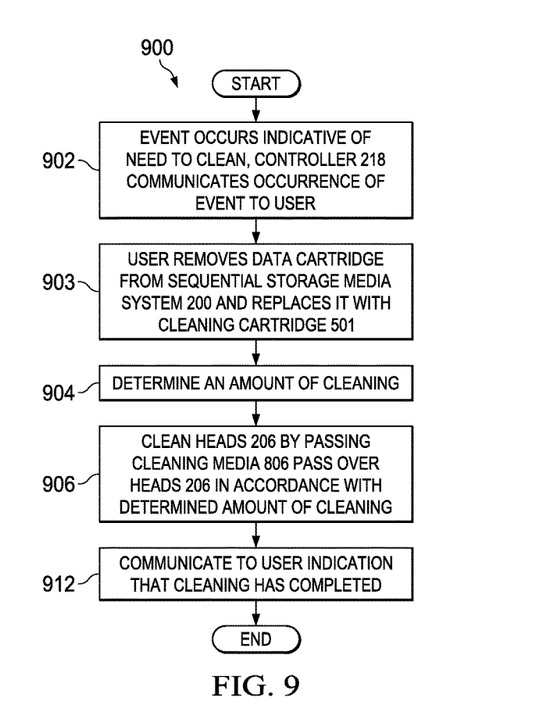
FIG. 9 illustrates a flow chart of an example method for dynamically cleaning a read/write head using the cleaning cartridge tape depicted in FIG. 8, in accordance with embodiments of the present disclosure.

FIG. 9 illustrates a flow chart of an example method 900 for dynamically cleaning a read/write head 206 using cleaning cartridge tape 504A, in accordance with embodiments of the present disclosure. According to some embodiments, method 900 may begin at step 902. As noted above, teachings of the present disclosure may be implemented in a variety of configurations of information handling system 102. As such, the preferred initialization point for method 900 and the order of the steps comprising method 900 may depend on the implementation chosen.

At step 902, with a data cartridge inserted in sequential storage media system 200, controller 218 may determine an event has occurred indicative of a need to clean one or more heads 206 and communicate the occurrence of such event to a user of information handling system 102. As an example, such data cartridge may include a "traditional" data cartridge which is similar to data cartridge 201, except that the sequential storage media tape 204 thereof includes sequential storage media 304, but no cleaning media 306. In some embodiments, the event may be a passage of a periodic interval of time (e.g., predetermined intervals of a number of days), wherein such passage of time indicates that one or more heads 206 should be cleaned. In these and other embodiments, such event may include a determination by controller 218 that a bit error rate of writes to or reads from a head 206 to or from sequential storage media of the data cartridge is above a predetermined threshold.

At step 903, the user may, in response to the event, remove the data cartridge from sequential storage media system 200 and replace it with cleaning cartridge 501 (having cleaning cartridge tape 504A) in order to clean one or more heads 206.

At step 904, controller 218 may determine an amount of cleaning. In some embodiments, such amount of cleaning may be based on a bit error rate of writes or reads between one or more heads 206 and sequential storage media of the data cartridge that was removed at step 903 (e.g., such that a larger amount of cleaning is applied for higher bit error rates, and a smaller amount of cleaning is applied for lower bit error rates). In these and other embodiments, such amount of cleaning may be defined by an amount of time that a portion of cleaning media 806 is to be passed over one or more heads 206 to undergo cleaning. In other embodiments, such amount of cleaning may be defined by a number of times a portion of cleaning media 806 is to be passed over one or more heads 206 to undergo cleaning.

At step 906, controller 218 may cause one or more heads 206 to be cleaned by causing cleaning media 806 to pass over the one or more heads 206 in accordance with the determined amount of cleaning. After such amount of cleaning is applied, method 900 may proceed to step 912.

At step 912, controller 218 may communicate to the user an alert or other indication that the cleaning process has completed, to which the user may respond by returning the same data cartridge or a new data cartridge to sequential storage media system 200, after which sequential storage media system 200 may return to its normal operation. After step 912, method 900 may end, subject to method 900 being applied again at a later time should another event occur as described with respect to step 902.

Although FIG. 9 discloses a particular number of steps to be taken with respect to method 900, method 900 may be executed with greater or fewer steps than those depicted in FIG. 9. In addition, although FIG. 9 discloses a certain order of steps to be taken with respect to method 900, the steps comprising method 900 may be completed in any suitable order.

Method 900 may be implemented using information handling system 102 or any other system operable to implement method 900. In certain embodiments, method 900 may be implemented partially or fully in software and/or firmware (e.g., firmware 222) embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
   determining an occurrence of an event indicative of a need to clean a head of a sequential storage media system;
   issuing to a user an indication of the occurrence of the event;
   determining an amount of cleaning for the head based on a bit error rate of input/output communication associated with the head; and
   cleaning the head in accordance with the amount of cleaning by passing cleaning media of a cleaning cartridge over the head;
   after cleaning the head, monitoring a post-cleaning bit error rate of input/output communication associated with the head, wherein said monitoring comprises:
   causing one or more heads to write a predetermined pattern to sequential storage media; and reading back the predetermined pattern from sequential storage media in order to determine the bit error rate; and repeating the cleaning and the monitoring steps responsive to detecting the post-cleaning bit error rate greater than a threshold bit error rate.

2. The method of claim 1, wherein the bit error rate prior to said cleaning is a bit error rate associated with input/output communication between the head and sequential storage media integral to a data cartridge received in the sequential storage media system at the time of the occurrence of the event.

3. The method of claim 2, wherein the cleaning cartridge and the data cartridge are distinct cartridges and wherein the method includes removing the data cartridge from the sequential storage media system and inserting the cleaning cartridge into the sequential storage media system before said cleaning.

4. The method of claim 3, wherein the threshold bit error rate is the pre-cleaning bit error rate.

5. The method of claim 3, wherein the post-cleaning bit error rate comprises a bit error rate associated with write operations between the head and the data cartridge.

6. The method of claim 3, wherein the post-cleaning bit error rate comprises a bit error rate associated with read operations between the head and the data cartridge.

7. The method of claim 2, wherein the cleaning cartridge is also the data cartridge and wherein the cleaning media and the sequential storage media are formed on a single tape between two reels of the data cartridge, and the sequential storage media comprises no more than ten percent of the length of the single tape.

8. The method of claim 2, wherein the cleaning cartridge is also the data cartridge and wherein the cleaning media and the sequential storage media are formed on a single tape between two reels of the data cartridge, and the cleaning media comprises no more than ten percent of the length of the single tape.

9. The method of claim 1, wherein the event is a passage of a periodic interval of time.

10. A sequential storage media system comprising:
a head for reading or writing data to sequential storage media; and
a controller communicatively coupled to the head, the controller configured to control winding of a tape comprising cleaning media between reels of a cleaning cartridge comprising the tape in order to perform operations comprising:
determining an occurrence of an event indicative of a need to clean a head of a sequential storage media system;
issuing to a user an indication of the occurrence of the event;
determining an amount of cleaning for the head based on a bit error rate of input/output communication associated with the head; and
cleaning the head in accordance with the amount of cleaning by passing cleaning media of a cleaning cartridge over the head;
after cleaning the head, monitoring a post-cleaning bit error rate of input/output communication associated with the head, wherein said monitoring comprises:
causing one or more heads to write a predetermined pattern to sequential storage media; and
reading back the predetermined pattern from sequential storage media in order to determine the bit error rate; and
repeating the cleaning and the monitoring steps responsive to detecting the post-cleaning bit error rate greater than a threshold bit error rate.

11. The sequential storage media system of claim 10, wherein the pre-cleaning bit error rate is a bit error rate associated with input/output communication between the head and sequential storage media integral to a data cartridge received in the sequential storage media system at the time of the occurrence of the event.

12. The sequential storage media system of claim 11, wherein the cleaning cartridge and the data cartridge are distinct cartridges and wherein the method includes removing the data cartridge from the sequential storage media system and inserting the cleaning cartridge into the sequential storage media system before said cleaning.

13. The sequential storage media system of claim 12, wherein the operations include: wherein the threshold bit error rate is the pre-cleaning bit error rate.

14. The sequential storage media system of claim 12, wherein the post-cleaning bit error rate comprises a bit error rate associated with write operations between the head and the data cartridge.

15. The sequential storage media system of claim 12, wherein the post-cleaning bit error rate comprises a bit error rate associated with read operations between the head and the data cartridge.

16. The sequential storage media system of claim 11, wherein the cleaning cartridge is also the data cartridge and wherein the cleaning media and the sequential storage media are formed on a single tape between two reels of the data cartridge, and the sequential storage media comprises no more than ten percent of the length of the single tape.

17. The sequential storage media system of claim 11, wherein the cleaning cartridge is also the data cartridge and wherein the cleaning media and the sequential storage media are formed on a single tape between two reels of the data cartridge, and the cleaning media comprises no more than ten percent of the length of the single tape.

18. The sequential storage media system of claim 10, wherein the event is a passage of a periodic interval of time.

19. An information handling system comprising:
a processor; and
a sequential storage media system communicatively coupled to the processor and comprising:
a head for reading or writing data to sequential storage media; and
a controller communicatively coupled to the head, the controller configured to control winding of a tape comprising cleaning media between reels of a cleaning cartridge comprising the tape in order to perform operations comprising:
determining an occurrence of an event indicative of a need to clean a head of a sequential storage media system;
determining an amount of cleaning for the head based on a bit error rate of input/output communication associated with the head;
cleaning the head in accordance with the amount of cleaning by passing cleaning media of a cleaning cartridge over the head;
after cleaning the head, monitoring a post-cleaning bit error rate of input/output communication associated with the head, wherein said monitoring comprises:
causing one or more heads to write a predetermined pattern to sequential storage media; and reading back the predetermined pattern from sequential storage media in order to determine the bit error rate; and repeating the cleaning and the monitoring steps responsive to detecting the post-cleaning bit error rate greater than a threshold bit error rate.

* * * * *